(12) United States Patent
Sindia et al.

(10) Patent No.: US 10,033,230 B2
(45) Date of Patent: Jul. 24, 2018

(54) CONTROLLING A WIRELESS POWER TRANSMITTER BASED ON HUMAN PRESENCE

(71) Applicant: INTEL CORPORATION, Santa Clara, CA (US)

(72) Inventors: Suraj Sindia, Hillsboro, OR (US); Songnan Yang, San Jose, CA (US); Zhen Yao, San Jose, CA (US); John M. Roman, Hillsboro, OR (US); Robert Paxman, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 342 days.

(21) Appl. No.: 14/866,571

(22) Filed: Sep. 25, 2015

(65) Prior Publication Data
US 2017/0093229 A1    Mar. 30, 2017

(51) Int. Cl.
*H02J 50/60* (2016.01)
*H04B 5/00* (2006.01)
*H02J 50/12* (2016.01)
*H02J 7/02* (2016.01)

(52) U.S. Cl.
CPC .............. *H02J 50/60* (2016.02); *H02J 7/025* (2013.01); *H02J 50/12* (2016.02); *H04B 5/0037* (2013.01)

(58) Field of Classification Search
CPC . H02J 50/60; H02J 7/025; H02J 50/12; H04B 5/0037
See application file for complete search history.

(56) References Cited

U.S. PATENT DOCUMENTS

| | | | | |
|---|---|---|---|---|
| 6,160,374 A | * | 12/2000 | Hayes | H02J 7/025 320/108 |
| 2011/0057606 A1 | | 3/2011 | Saunamaki | |
| 2011/0128714 A1 | * | 6/2011 | Terao | H02J 7/025 361/807 |
| 2012/0112543 A1 | * | 5/2012 | van Wageningen | H02J 7/025 307/43 |
| 2012/0249449 A1 | | 10/2012 | Tseng et al. | |
| 2013/0069441 A1 | * | 3/2013 | Verghese | G01R 33/10 307/104 |
| 2013/0082538 A1 | * | 4/2013 | Wambsganss | H02J 5/005 307/104 |
| 2013/0127253 A1 | * | 5/2013 | Stark | A61N 1/3787 307/104 |

(Continued)

FOREIGN PATENT DOCUMENTS

| | | |
|---|---|---|
| EP | 2803522 A1 | 11/2014 |
| WO | 2014064489 A1 | 5/2014 |

OTHER PUBLICATIONS

EP Search Report, EP Application No. 16185143, date of completion Feb. 1, 2017, 2 pages.

*Primary Examiner* — Jared Fureman
*Assistant Examiner* — Esayas Yeshaw
(74) *Attorney, Agent, or Firm* — International IP Law Group, P.L.L.C.

(57) ABSTRACT

Techniques for proximity sensing in a wireless power transmitter in a system, method, and apparatus are described herein. For example, an apparatus may include a transmitter coil configured to generate a magnetic field. The apparatus may also include a controller configured to reduce a strength of the magnetic field based on a proximity detection of an object.

23 Claims, 5 Drawing Sheets

(56) References Cited

U.S. PATENT DOCUMENTS

| | | | |
|---|---|---|---|
| 2013/0162025 A1* | 6/2013 | Momose | B60L 11/1862 307/9.1 |
| 2013/0169348 A1* | 7/2013 | Shi | H04B 1/3838 327/517 |
| 2013/0257360 A1* | 10/2013 | Singh | H01F 38/14 320/108 |
| 2014/0009109 A1* | 1/2014 | Lee | H02J 17/00 320/108 |
| 2015/0048752 A1* | 2/2015 | Van Den Brink | H02J 5/005 315/246 |
| 2016/0028245 A1* | 1/2016 | Von Novak | H02J 5/005 307/104 |
| 2017/0117756 A1* | 4/2017 | Muratov | H02J 50/60 |

* cited by examiner

CONTROLLING A WIRELESS POWER TRANSMITTER BASED ON HUMAN PRESENCE

TECHNICAL FIELD

This disclosure relates generally to techniques for wireless charging. Specifically, this disclosure relates to detecting the presence of a person in the vicinity of a wireless power transmitter.

BACKGROUND ART

A basic wireless charging system may include a wireless power transmitter unit (PTU) and a wireless power receiving unit (PRU). For example, a PTU may include a transmit (Tx) coil and a PRU may include receive (Rx) coil. The Tx and Rx coils may be referred to as induction coils. In a typical induction charger, the Tx coil creates an alternating electromagnetic field and the Rx coil takes power from the electromagnetic field and converts it back into electrical current to charge the battery. The two induction coils in proximity combine to form an electrical transformer. Greater distances between sender and receiver coils can be achieved when the inductive charging system uses resonant inductive coupling.

In some cases, a PRU may be implemented in a computing device, such as a mobile computing device, that can be placed on a charging mat including a PTU. The wireless energy emitted by the PTU is subject to various industry standards and regulatory standards that limit the level of power that RF transmitters are allowed to emit. For example, organizations such as Alliance for Wireless Power (A4WP), and Wireless Power Consortium (WPC) among others define standards for interoperability such as the frequency of operation and other parameters that define magnitude of fields and power levels in wireless power systems. Such systems should also conform to regulatory standards for RF exposure as required by regulatory bodies such as the US Federal Communications Commission (FCC) and guidelines by the International Commission on Non-Ionizing Radiation (ICNIRP)

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

The present disclosure relates generally to techniques for wireless charging. More specifically, the techniques described herein provide a technique for controlling the power level of a transmitted wireless charging signal based on whether a person in the vicinity of a wireless power transmitter. A system in accordance with the present techniques can use capacitively coupled proximity sensors that are incorporated close to the Tx coil to sense the presence of a human tissue in close proximity. If human tissue is detected, the fields radiated by the wireless power system are reduced to maintain conformance to regulatory requirements for RF exposure as specified by the regulatory bodies the FCC and guidelines by the ICNIRP. If human tissue is not detected, the fields radiated by the wireless power system can be increased to provide faster battery charging.

In some cases, the techniques discussed herein may be implemented using a wireless charging standard protocol, such as the specification provided by Alliance For Wireless Power (A4WP) version 1.3, Nov. 5, 2014. A wireless power receiving (Rx) coil may be a component in a power receiving unit (PRU), while a wireless power transmission (Tx) coil may be a component in a power transmitting unit (PTU), as discussed in more detail below. However, the techniques described herein may be implemented using any other wireless charging standard protocol where applicable.

Figure 1:
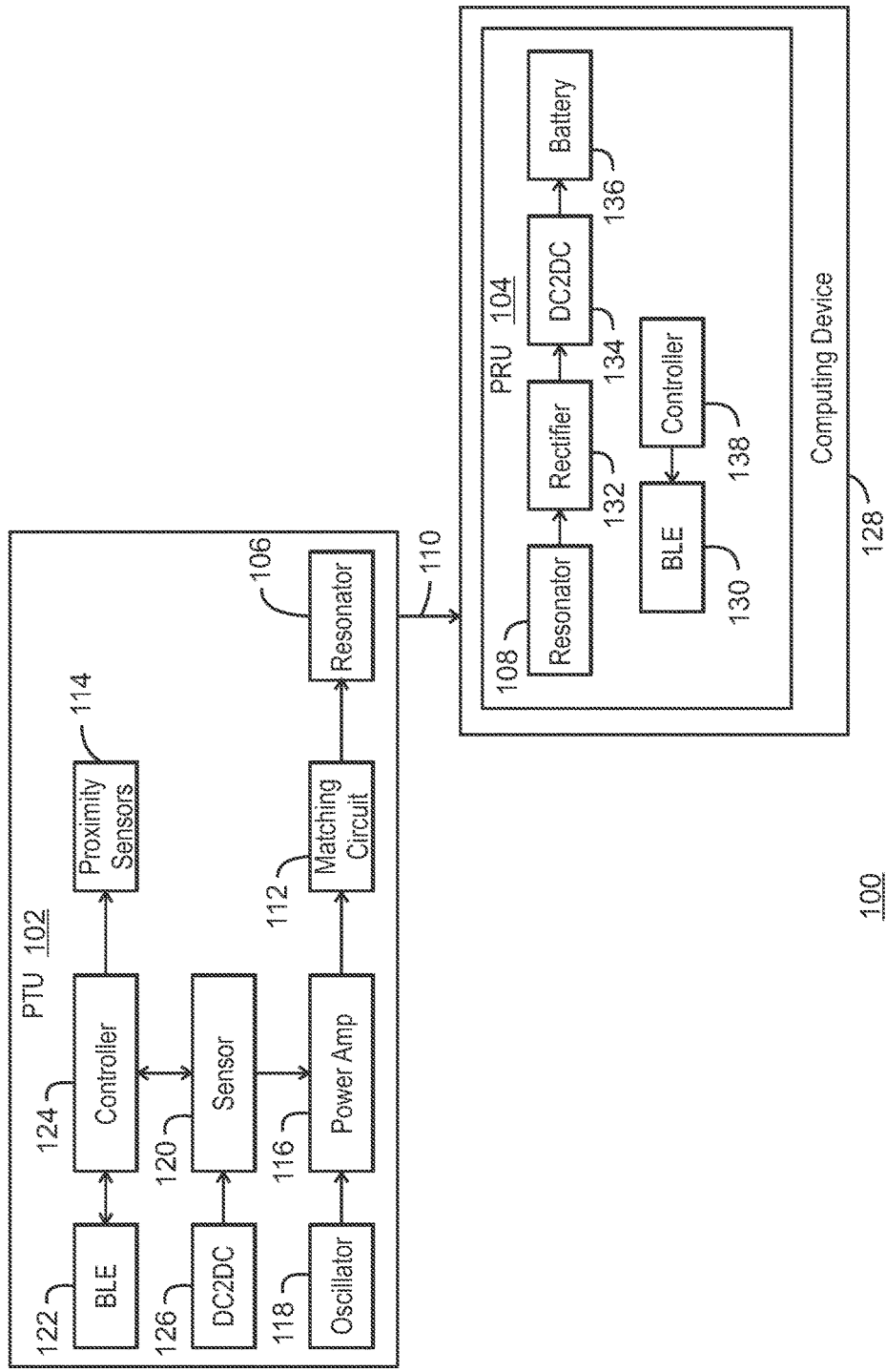
FIG. 1 is block diagram of a PTU to provide power to a PRU, wherein the PTU includes a presence detection circuit.

FIG. 1 is block diagram of a PTU to provide power to a PRU, wherein the PTU includes a presence detection circuit. A PTU 102 may be coupled to a PRU 104 via magnetic inductive coupling between resonators 106 and 108, as indicated by the arrow 110. The PRU 104 may be a component of a computing device 128 configured to receive charge by the inductive coupling 110. The resonator 106 may be referred to herein as a Tx coil 106 of the PTU 102. The resonator 108 may be referred to herein as an Rx coil 108 of the PRU 104.

The PTU 104 may include a matching circuit 112 configured to match the amplified oscillation provided to the resonator 106 of the PTU 102. The matching circuit 112 may include any suitable arrangement of electrical components such as capacitors, inductors, and other circuit elements that can be adjusted match the resonator 106 to the power amplifier 116. The operation of the matching circuit 112 can generate a reactance shift to compensate for detuning of the magnetic inductive coupling 110.

Other components of the PTU may include a power amplifier 116, and oscillator 118, a current sensor 120, a Bluetooth Low Energy (BLE) module 122, a controller 124, direct current to direct current (DC2DC) converter 126, and the like. The current sensor 120 may be an ampere meter, a volt meter, or any other sensor configured to sense load variations occurring due to inductive coupling between the PTU 102 and another object, such as the PRU 104. The current sensor 120 may provide an indication of load change to the controller 140 of the PTU 102. The controller 140 may power on the power amplifier 116 configured to receive direct current (DC) from the DC2DC converter 126, and to amplify and oscillate the current. The oscillator 118 may be configured to oscillate the power provided at a given frequency.

As shown in FIG. 1, an inductive coupling 110 may occur between the Tx coil 106 and the Rx coil 108, and as a magnetic flux associated with the inductive coupling passes through the Rx coil 108 the computing device 111 may receive power. A rectifier 132 may receive voltage having an alternating current (AC) from the Rx coil 108 and may be configured to generate a rectified voltage (Vrect) having a direct current (DC). As illustrated in FIG. 1, a DC2DC converter 134 may provide a DC output to a battery 136.

The PRU 104 may also include a controller 138 configured to initiate a wireless broadcast having wireless handshake data. As discussed above, the wireless handshake broadcast may be carried out by a wireless data transmission component such as BLE module 130.

The PTU 102 also includes one or more proximity sensors 114 for detecting the presence a person or animal in the vicinity of the resonator 106. In some examples, the proximity sensors are capacitive. Capacitive proximity sensors can include adjacent conductive pads to which are applied an electrical charge. The presence of human tissue such as a person's hand near the proximity sensor 114 causes a change in the dielectric constant of the capacitor, which can be detected by the proximity sensor 114. As an example, touching the proximity sensor 114 with a person's hand may be expected to result in approximately 10 pico Farads or change, placing the hand in close proximity to the proximity sensor 114 may be expected to result in approximately 1 pico Farad of change, while a 50 to 100 femto Farad change may still indicate some degree of proximity to the proximity sensor 114. Any suitable number of proximity sensors may be used, including one, two, three, four, or more. If multiple proximity sensors 112 are used, the proximity sensors may be placed around the periphery of the resonator 106.

The proximity sensors may be coupled to the controller 124. Based on the detection or non-detection of human or animal tissue, the controller 124 can determine the strength of wireless charging signal. For example, the controller may control the amplification level applied by the power amplifier 116, which controls the magnitude of the current delivered to the resonator 106. In embodiments with multiple proximity sensors 112, the output of the proximity sensors 112 may be processed according to a voting algorithm. For example, depending on the design of a particular embodiment, the magnitude of the current delivered to the resonator 106 may be reduced if any single proximity sensor detects an object, or a majority of the proximity sensors detect an object, or all of the proximity sensors detect an object.

The proximity sensors can calibrated in the absence of any human tissue and at maximum load to obtain a baseline level that indicates non-presence of human tissue at maximum load. The load refers to the electrical effect on the resonator 106 due to the computing device 128. A larger device, such as a tablet would be expected to have a higher load compared to a smaller device, such as a smart phone. Additionally, a threshold capacitance change, ΔCth, can be defined such that any capacitance change above the baseline level greater than the threshold capacitance change, ΔCth, can be used to indicate presence of human or animal tissue. The threshold capacitance change, ΔCth, can be determined based on empirical evaluation of detection thresholds of human subjects. Whenever the change in the detected capacitance is higher than the threshold capacitance change, ΔCth, the control logic sets a lower maximum current limit that can be driven into the resonator 106. A reduced drive current into the resonator 106 helps to maintain the RF exposure below the regulatory specifications.

The block diagram of FIG. 1 is not intended to indicate that the PTU 102 and/or the PRU 104 are to include all of the components shown in FIG. 1. Further, the PTU 102 and/or the PRU 104 may include any number of additional components not shown in FIG. 1, depending on the details of the specific implementation.

Figure 2:
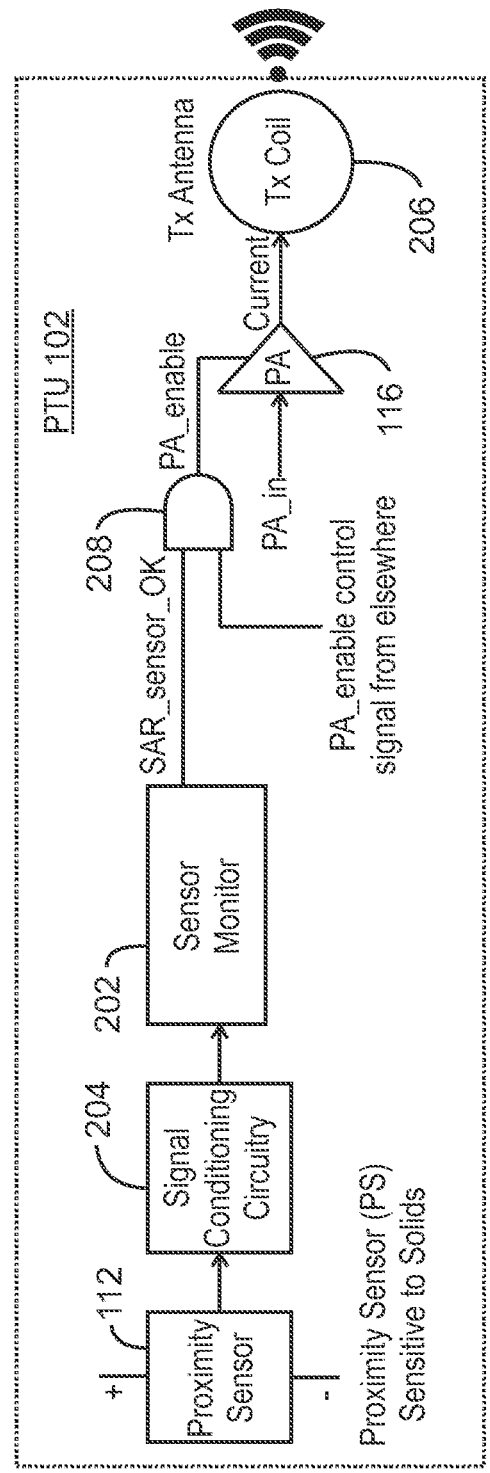
FIG. 2 is block diagram of an example circuit that can be used to control the signal strength of a wireless charging signal based on the detection of presence.

FIG. 2 is block diagram of an example circuit that can be used to control the signal strength of a wireless charging signal based on the detection of presence. The circuit 200 of FIG. 2 includes the proximity sensor 112 coupled to a sensor monitor 202. As shown in FIG. 2, the proximity sensor 112 may be coupled to a voltage source. The sensor monitor 202 can include any suitable type of hardware or combination of hardware and programming. For example, the sensor monitor 202 may include logic circuits, microcontrollers, general purpose processors executing computer code, and the like. The sensor monitor 202 may be included as a component of the controller 124 shown in FIG. 1, a sensor hub (not shown), or may be a separate component. The sensor monitor 202 receives a signal from the proximity sensor 112 that varies in response to the presence of objects in its vicinity. For example, in the case of a capacitive proximity sensor 112, the proximity sensor 112 may generate an AC voltage signal wherein the magnitude and/or frequency of the signal changes in response to changing capacitance of the proximity sensor 112. In some examples, the circuit 200 also includes a signal conditioning circuitry 204 coupled between the proximity sensor 112 and the sensor monitor 202. The signal conditioning function 204 may be a low-pass filter to remove high frequency noise and thereby average out random spikes from the data.

In FIG. 2, the resonator is shown as Tx coil 206 The current driven out of the power amplifier 116 and into the Tx coil controls the radiated electric and magnetic fields. In the presence of a human tissue, the proximity sensor 112 may issue an interrupt PS_serv_req signal to the sensor monitor 202, which then senses the capacitance change, for example, by polling the output of the signal conditioning circuitry 204 that processes the output of the proximity sensor 112. The SAR_sensor_OK signal is a signal to determine any malfunctioning in the proximity sensor 112. As shown in FIG. 2, the SAR_sensor_OK signal may be input to a logic circuit such an AND gate 208 in combination with a PA_enable signal received from another component of the PTU 102, such as the controller 124. In this way, the SAR_sensor_OK signal gates the PA_enable signal driving the power amplifier, and the Tx coil can be disabled or enabled only at reduced power if the proximity sensor 112 is not functioning properly.

In the presence of human tissue, the change in capacitance detected by the proximity sensor 112 will likely be higher than the threshold capacitance $\Delta C_{th}$ that is calibrated to a value that is prevailing in the absence of human tissue at maximum load. This helps to ensure that the change in capacitance detected by the proximity sensor 112 is only due to the presence of a human tissue and not due to the increased load of a larger receiving device like a notebook instead of a phone. Whenever the change in the detected capacitance is higher than a threshold, $\Delta C_{th}$, the control logic sets a lower maximum current limit that can be driven into the Tx coil. A reduced drive current into the Tx coil helps in maintaining the RF exposure below the regulatory limits. In some examples, the maximum current limit is controlled by controlling the current fed to the input of the power amplifier, PA_in. In the example shown in FIG. 3, the maximum current limit is controlled by controlling the gain of the power amplifier 116.

Figure 3:
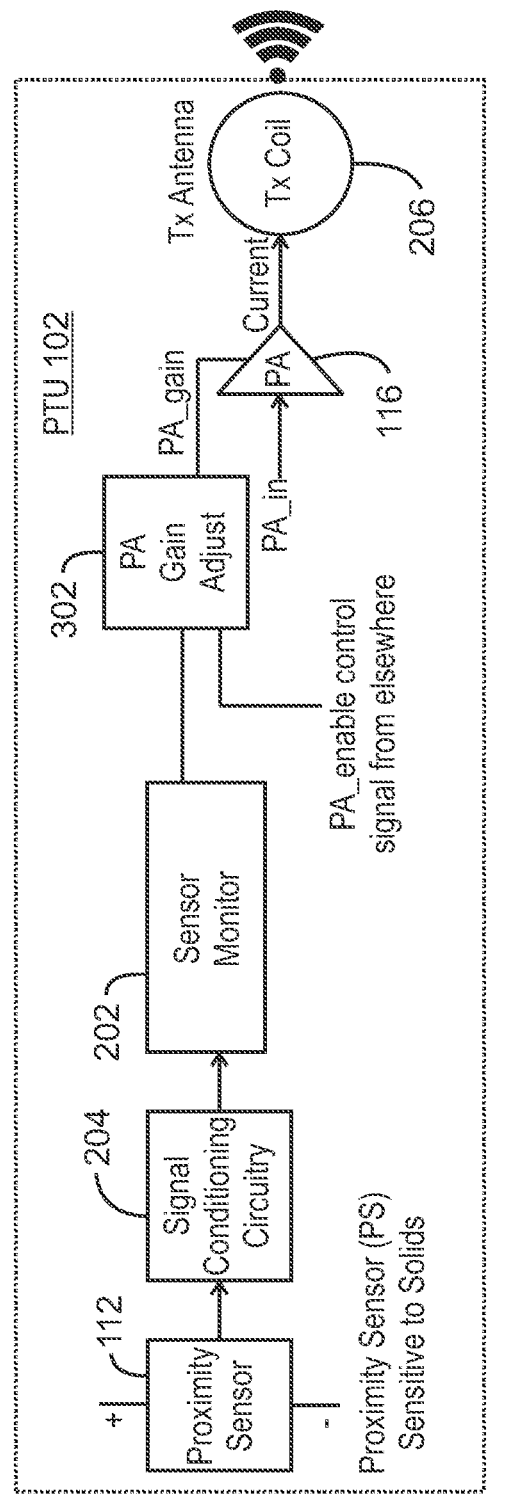
FIG. 3 is block diagram of another example circuit that can be used to control the signal strength of a wireless charging signal based on the detection of presence.

FIG. 3 is block diagram of another example circuit that can be used to control the signal strength of a wireless charging signal based on the detection of presence. The example circuit of FIG. 3 operates similarly to the example circuit shown in FIG. 2, and includes proximity sensor 112, the signal conditioning circuitry 204 and the sensor monitor 202. However, in this example, the sensor monitor 202 controls the output of the current from transmitter coil 204 by controlling the gain of the power amplifier 116.

In the presence of a human tissue, the proximity sensor 112 may issue an interrupt PS_serv_req signal to the sensor monitor 202, which then senses the capacitance change. The degree of the capacitance change may then be used to determine a gain level of the power amplifier 116. The sensor monitor 202 sends a corresponding gain signal to the gain adjust circuitry 302. The PA_enable signal received from another component of the PTU 102 is also fed to the gain adjust circuitry 302. The output of the gain adjust circuitry 302 is sent to the gain control input of the power amplifier 116.

Figure 4:
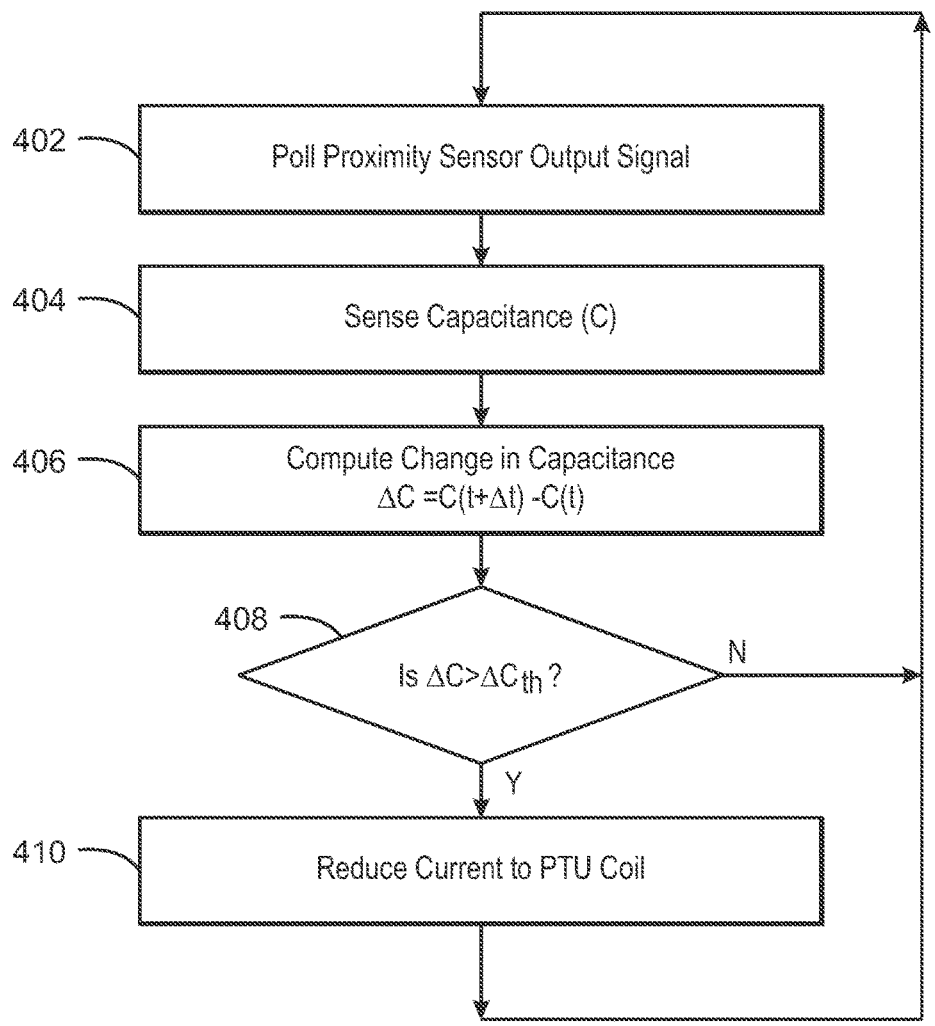
FIG. 4 is a process flow diagram showing an example of a method to control a wireless charging transmitter.

FIG. 4 is a process flow diagram showing an example of a method to control a wireless charging transmitter. The method 400 may be performed by the PTU 102 shown in FIGS. 1 to 3. The logic for performing the processed described below may be embodied in hardware, such as logic circuitry or one or more processors configured to execute instructions stored in a non-transitory, computer-readable medium. The method may begin at block 402.

At block 402, the output signal of the proximity sensor is received. At block 404, the received signal is processed to compute the sensed capacitance change, $\Delta C$. The capacitance change, $\Delta C$, can be computed by monitoring the accumulated charge over the duration of sensing, $\Delta t$, wherein the accumulated charge is the integrated instantaneous current over the duration of sensing, as shown in the following equations:

$$\Delta C = Q/V \quad Q = \int_0^{delta\ T_i} dt$$

In the above equation, V is normalized reference voltage.

At block 406, the change in capacitance, $\Delta C$, is computed for a particular time period, $\Delta t$, which is the duration of time from the start of the sensing operation. $\Delta t$ the beginning of the method $\Delta t$ is zero, and $\Delta t$ is reset each time the proximity sensor is triggered leading to a current reduction operation.)

At block 408, the change in capacitance, $\Delta C$, is compared to the threshold capacitance change, $\Delta C_{th}$, that was computed during the calibration of the PTU 102. If the change in capacitance is less than the threshold, the process flow returns to block 402 and the process can be repeated. The process may be repeated periodically while the PTU 102 is operable.

If the change in capacitance is greater than the threshold, the process flow advances to block 410. At block 410, the setting of maximum current allowed to be delivered to the Tx coil is reduced. In some examples, reducing the maximum allowed current to the Tx coil may mean turning off the current to the Tx coil. In some examples, reducing the current to the Tx coil may mean reducing the current below a pre-specified level, such as a level specified by an industry standard or regulation. In some examples, the reduction of the max current level may be proportional to the degree of change in the capacitance. After the current to the Tx coil is reduced, the process flow may return to block 402.

The method 400 should not be interpreted as meaning that the blocks are necessarily performed in the order shown. Furthermore, fewer or greater actions can be included in the method 400 depending on the design considerations of a particular implementation.

Figure 5:
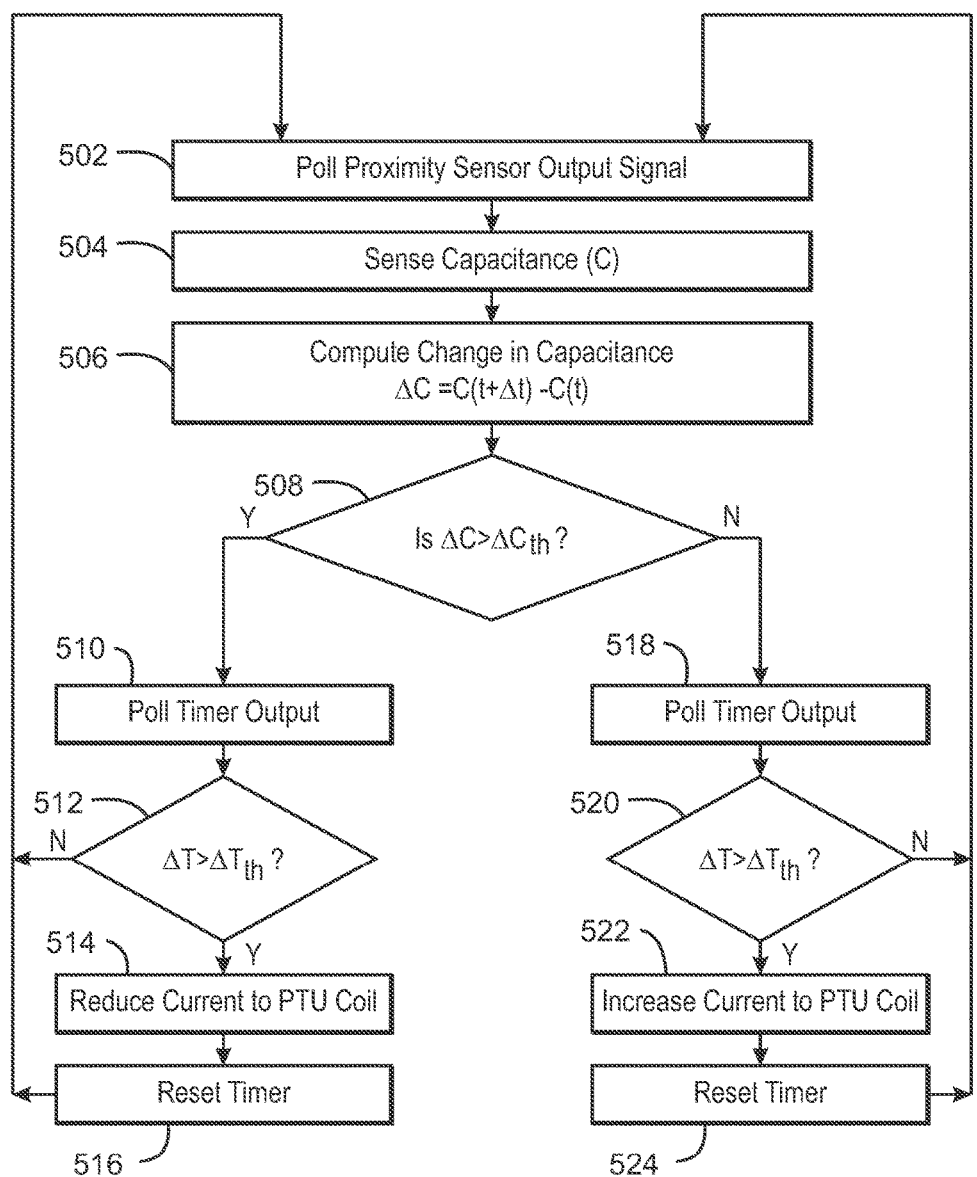
FIG. 5 is a process flow diagram showing another example of a method to control a wireless charging transmitter.

FIG. 5 is a process flow diagram showing another example of a method to control a wireless charging transmitter. The method 500 may be performed by the PTU 102 shown in FIGS. 1 to 3. The logic for performing the processed described below may be embodied in hardware, such as logic circuitry or one or more processors configured to execute instructions stored in a non-transitory, computer-readable medium.

The method may begin at block 502 and proceed similarly to the method 400. At the start of the method 500, $\Delta t$ equals zero. At block 502, the output signal of the proximity sensor is received. At block 504, the received signal is used processed to compute the sensed capacitance. At block 506, the change in capacitance, $\Delta C$, is computed for a particular time period, $\Delta t$. At block 508, the change in capacitance, $\Delta C$, is compared to the threshold capacitance change, $\Delta C th$, that was computed during the calibration of the PTU 102.

If the change in capacitance is greater than the threshold capacitance change, $\Delta C th$, the process flow advances to block 510. At block 510, a timer is started and the process flow advances to block 512. At block 512, a determination is made regarding whether the time elapsed since the start of the timer is greater than a threshold time. If the elapsed time is not greater than the threshold time, the process flow returns to block 502 and the process repeats.

If the elapsed time is greater than the threshold time, the process flow advances to block 514. At block 514, the current to the Tx coil is reduced. As mentioned above, reducing the current to the Tx coil may mean turning off the current to the Tx coil, reducing the current below a pre-specified level, and/or reducing the max current level in proportional to the degree of change in the capacitance. After the setting for max current to the Tx coil is reduced, the process flow may advance to block 516. At block 516, the timer is reset. The process flow then returns to block 502 and the process repeats.

Returning to block 508, if the change in capacitance is less than the threshold, the process flow advances to block 518. At block 518, a timer is started and the process flow advances to block 520. At block 520, a determination is made regarding whether the time elapsed since the start of the timer is greater than a threshold time. If the elapsed time is not greater than the threshold time, the process flow returns to block 502 and the process repeats.

If the elapsed time is greater than the threshold time, the process flow advances to block 522. At block 522, the current to the Tx coil is increased. Increasing the current to the Tx coil may mean turning on the current to the Tx coil, increasing the current above a pre-specified level, and/or increasing the max current level in proportional to the degree of change in the capacitance. After the setting for max current to the Tx coil is increased, the process flow may advance to block 524. At block 524, the timer is reset. The process flow then returns to block 502 and the process repeats.

The method 500 should not be interpreted as meaning that the blocks are necessarily performed in the order shown. Furthermore, fewer or greater actions can be included in the method 500 depending on the design considerations of a particular implementation.

EXAMPLES

Example 1 is an apparatus for proximity sensing in a wireless power transmitter. The apparatus includes a transmitter coil configured to generate a magnetic field; and a controller configured to reduce a strength of the magnetic field based on a proximity detection of an object.

Example 2 includes the apparatus of example 1, including or excluding optional features. In this example, the controller is coupled to a proximity sensor configured to detect a change in capacitance associated with the object. Optionally, the strength of the magnetic field is reduced to a predefined maximum. Optionally, the predefined maximum is associated with a safety level of magnetic field exposure to the object. Optionally, the proximity detection is based on a detected change in capacitive coupling of the transmitter coil.

Example 3 includes the apparatus of any one of examples 1 to 2, including or excluding optional features. In this example, the apparatus includes a timer to detect a time period associated with the proximity detection of the object. Optionally, the controller is configured to reduce the strength of the magnetic field if the time period associated with the proximity detection of the object exceeds a predetermined threshold.

Example 4 includes the apparatus of any one of examples 1 to 3, including or excluding optional features. In this example, the controller is configured to increase the magnetic field strength in the absence of the proximity detection of the object.

Example 5 includes the apparatus of any one of examples 1 to 4, including or excluding optional features. In this example, the object is a user.

Example 6 includes the apparatus of any one of examples 1 to 5, including or excluding optional features. In this example, the controller is coupled to a plurality of proximity sensors configured to reduce errors in proximity detection of the object.

Example 7 is a method for proximity sensing in a wireless power transmitter. The method includes generating a magnetic field at a transmitter coil; and reducing a strength of the magnetic field based on a proximity detection of an object near the transmitter coil.

Example 8 includes the method of example 7, including or excluding optional features. In this example, the proximity detection is based on a change in capacitance associated with the object. Optionally, the strength of the magnetic field is reduced to a predefined maximum. Optionally, the predefined maximum is associated with a safety level of magnetic field exposure to the object. Optionally, the proximity detection is based on a detected change in capacitive coupling of the transmitter coil.

Example 9 includes the method of any one of examples 7 to 8, including or excluding optional features. In this example, the method includes detecting a time period associated with the proximity detection of the object. Optionally, reducing the strength of the magnetic field is performed if the time period associated with the proximity detection of the object exceeds a predetermined threshold.

Example 10 includes the method of any one of examples 7 to 9, including or excluding optional features. In this example, the method includes increasing the magnetic field strength in the absence of the proximity detection of the object.

Example 11 includes the method of any one of examples 7 to 10, including or excluding optional features. In this example, the object is a user.

Example 12 includes the method of any one of examples 7 to 11, including or excluding optional features. In this example, the method includes reducing errors in proximity detection of the object by detecting capacitance change at a plurality of proximity sensors.

Example 13 is a system for proximity sensing in a wireless power transmitter. The system includes a transmitter coil configured to generate a magnetic field; a proximity sensor configured to detect a change in capacitance associated with an object near the transmitter coil; and a controller configured to reduce a strength of the magnetic field based on the detected capacitance change.

Example 14 includes the system of example 13, including or excluding optional features. In this example, the strength of the magnetic field is reduced to a predefined maximum associated with a safety level of magnetic field exposure to the object.

Example 15 includes the system of any one of examples 13 to 14, including or excluding optional features. In this example, the detected capacitance change is a capacitance change of a capacitive coupling of the transmitter coil.

Example 16 includes the system of any one of examples 13 to 15, including or excluding optional features. In this example, the controller is configured to increase the magnetic field strength if the capacitance change indicates an absence of the object.

Example 17 includes the system of any one of examples 13 to 16, including or excluding optional features. In this example, the system includes a timer to detect a time period associated with the detected capacitance change. Optionally, the controller is configured to reduce the strength of the magnetic field if the time period associated with the proximity detection of the object exceeds a predetermined threshold. Optionally, the controller is configured to increase the strength of the magnetic field if the time period associated with the proximity detection of the object exceeds a predetermined threshold and the capacitance change indicates an absence of the object.

Example 18 includes the system of any one of examples 13 to 17, including or excluding optional features. In this example, the object is a user.

Example 19 includes the system of any one of examples 13 to 18, including or excluding optional features. In this example, the controller is coupled to a plurality of proximity sensors configured to reduce errors in proximity detection of the object. Optionally, the controller performs a voting algorithm on data received from the proximity sensors.

Example 20 is an apparatus for proximity sensing in a wireless power transmitter. The apparatus includes means for generating a magnetic field at a transmitter coil; and means for reducing a strength of the magnetic field based on a proximity detection of an object near the transmitter coil.

Example 21 includes the apparatus of example 20, including or excluding optional features. In this example, the proximity detection is based on a change in capacitance associated with the object. Optionally, the strength of the magnetic field is reduced to a predefined maximum. Optionally, the predefined maximum is associated with a safety level of magnetic field exposure to the object. Optionally, the proximity detection is based on a detected change in capacitive coupling of the transmitter coil.

Example 22 includes the apparatus of any one of examples 20 to 21, including or excluding optional features. In this example, the apparatus includes means for detecting a time period associated with the proximity detection of the object. Optionally, the means for reducing the strength of the magnetic field reduce the strength of the magnetic field if the time period associated with the proximity detection of the object exceeds a predetermined threshold.

Example 23 includes the apparatus of any one of examples 20 to 22, including or excluding optional features. In this example, the apparatus includes means for increasing the magnetic field strength in the absence of the proximity detection of the object.

Example 24 includes the apparatus of any one of examples 20 to 23, including or excluding optional features. In this example, the object is a user.

Example 25 includes the apparatus of any one of examples 20 to 24, including or excluding optional features. In this example, the apparatus includes means for reducing errors in proximity detection of the object by detecting capacitance change at a plurality of proximity sensors.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for proximity sensing in a wireless power transmitter, comprising:
    a transmitter coil configured to generate a magnetic field for charging a battery of a wireless power receiver;
    a capacitive proximity sensor adjacent to the transmitter coil; and
    a controller configured to:
    determine a capacitance level measured by the capacitive proximity sensor;
    compare the capacitance level to a baseline capacitance level to determine a capacitance change;
    identify a proximity detection of an object by determining that the capacitance change is above a threshold capacitance change; and
    in response to the proximity detection, reduce a strength of the magnetic field to continue charging and reduce RF exposure below an exposure level specified by a regulatory specification.

2. The apparatus of claim 1, wherein the strength of the magnetic field is reduced to a predefined maximum.

3. The apparatus of claim 1, wherein the predefined maximum is associated with a safety level of magnetic field exposure to the object.

4. The apparatus of claim 1, wherein the proximity detection is based on a detected change in capacitive coupling of the transmitter coil.

5. The apparatus of claim 1, further comprising a timer to detect a time period associated with the proximity detection of the object.

6. The apparatus of claim 5, wherein the controller is configured to reduce the strength of the magnetic field if the time period associated with the proximity detection of the object exceeds a predetermined threshold.

7. The apparatus of claim 1, wherein the controller is configured to increase the magnetic field strength in the absence of the proximity detection of the object.

8. The apparatus of claim 1, wherein the object comprises a user.

9. The apparatus of claim 1, wherein the controller is coupled to a plurality of proximity sensors configured to reduce errors in proximity detection of the object.

10. A method for proximity sensing in a wireless power transmitter, comprising:
    generating a magnetic field at a transmitter coil for charging a battery of a wireless power receiver;
    receiving a capacitance level from a capacitive proximity sensor;
    comparing the capacitance level to a baseline capacitance level to determine a capacitance change;
    identifying a proximity detection of an object by determining that the capacitance change is above a threshold capacitance change; and
    in response to the proximity detection, reducing a strength of the magnetic field to continue charging and reduce RF exposure below an exposure level specified by a regulatory specification.

11. The method of claim 10, wherein the strength of the magnetic field is reduced to a predefined maximum.

12. The method of claim 10, wherein the predefined maximum is associated with a safety level of magnetic field exposure to the object.

13. The method of claim 10, wherein the proximity detection is based on a detected change in capacitive coupling of the transmitter coil.

14. The method of claim 10, further comprising detecting a time period associated with the proximity detection of the object.

15. The method of claim 14, wherein reducing the strength of the magnetic field is performed if the time period associated with the proximity detection of the object exceeds a predetermined threshold.

16. The method of claim 10, further comprising increasing the magnetic field strength in the absence of the proximity detection of the object.

17. The method of claim 10, wherein the object is a user.

18. The method of claim 10, further comprising reducing errors in proximity detection of the object by detecting capacitance change at a plurality of proximity sensors.

19. A system for proximity sensing in a wireless power transmitter, comprising:
    a transmitter coil configured to generate a magnetic field for charging a battery of a wireless power receiver;
    a proximity sensor configured to detect a change in capacitance associated with an object near the transmitter coil; and a controller configured to:

determine a capacitance level measured by the proximity sensor;

compare the capacitance level to a baseline capacitance level to determine a capacitance change;

identify a proximity detection of an object by determining that the capacitance change is above a threshold capacitance change; and in response to the proximity detection, reduce a strength of the magnetic field to continue charging and reduce RF exposure below an exposure level specified by a regulatory specification.

20. The system of claim 19, wherein the strength of the magnetic field is reduced to a predefined maximum associated with a safety level of magnetic field exposure to the object.

21. The system of claim 19, wherein the detected capacitance change is a capacitance change of a capacitive coupling of the transmitter coil.

22. The system of claim 19, wherein the controller is configured to increase the magnetic field strength in the absence of the proximity detection of the object.

23. The system of claim 19, further comprising a timer to detect a time period associated with the proximity detection of the object, and wherein the controller is configured to reduce the strength of the magnetic field if the time period associated with the proximity detection of the object exceeds a predetermined threshold.

* * * * *